United States Patent
Matsuura (10) Patent No.: US 8,477,993 B2
(45) Date of Patent: Jul. 2, 2013

(54) IMAGE TAKING APPARATUS AND IMAGE TAKING METHOD

(75) Inventor: Takayuki Matsuura, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 1315 days.

(21) Appl. No.: 12/238,266

(22) Filed: Sep. 25, 2008

(65) Prior Publication Data

US 2009/0087039 A1    Apr. 2, 2009

(30) Foreign Application Priority Data

Sep. 28, 2007 (JP) ................................ 2007-255832

(51) Int. Cl.
*G06K 9/00* (2006.01)
(52) U.S. Cl.
USPC ............................ 382/103; 382/165; 382/170
(58) Field of Classification Search
USPC ................ 382/100, 103, 118, 195, 104, 115, 382/173; 345/90, 473, 707, 705, 709; 348/E05.001, E05.024, E05.031, E05.047, 348/222.1, 333.01, 333.11, 333.12, 345, 348/347; 707/1; 340/541–542
See application file for complete search history.

(56) References Cited

U.S. PATENT DOCUMENTS

| | | | | |
|---|---|---|---|---|
| 6,952,496 B2* | 10/2005 | Krumm | ........................... | 382/170 |
| 7,227,893 B1* | 6/2007 | Srinivasa et al. | ......... | 375/240.08 |
| 7,317,485 B1* | 1/2008 | Miyake et al. | ........... | 348/333.02 |
| 7,916,182 B2* | 3/2011 | Itoh | .............................. | 348/222.1 |
| 7,965,866 B2* | 6/2011 | Wang et al. | ................... | 382/103 |
| 2005/0179791 A1* | 8/2005 | Iga | .............................. | 348/231.6 |
| 2005/0249382 A1* | 11/2005 | Schwab et al. | ................. | 382/115 |
| 2006/0192784 A1* | 8/2006 | Yamaji et al. | .................. | 345/473 |
| 2006/0197845 A1 | 9/2006 | Masaki | | |
| 2006/0284810 A1* | 12/2006 | Aratani et al. | ................... | 345/90 |
| 2007/0183638 A1 | 8/2007 | Nakamura | | |
| 2007/0195174 A1* | 8/2007 | Oren | ........................... | 348/222.1 |
| 2008/0024643 A1* | 1/2008 | Kato | ........................ | 348/333.01 |

(Continued)

FOREIGN PATENT DOCUMENTS

| | | | |
|---|---|---|---|
| JP | 2003-92701 A | | 3/2003 |
| JP | 2004-336265 | * | 11/2004 |
| JP | 2006-5662 A | | 1/2006 |
| JP | 2006-237961 A | | 9/2006 |

OTHER PUBLICATIONS

English translation for Patent Abstraction of Japan publication No. 2004-336265, on Nov. 25, 2004, Imaging Apparatus by Ichikawa Koji (Fuji Photo Film Co Ltd) pp. 1-10.*

*Primary Examiner* — Hadi Akhavannik
*Assistant Examiner* — Mehdi Rashidian
(74) *Attorney, Agent, or Firm* — Birch, Stewart, Kolasch & Birch, LLP (57) ABSTRACT

In an automatic shooting mode, a CPU of a digital camera displays on an LCD a number setting display for setting the number of people to be taken. After the number of people to be taken is set, a through image taken by the CCD is stored in a frame memory and displayed on the LCD. A face detecting section detects and counts faces contained in the through image, and outputs the number of faces as the number of detected people to a number matching section. The number matching section judges whether the set number stored in the frame memory matches the detected number input from the face detecting section. When the number matching section judges that the numbers match each other, the CPU performs an image-taking processing after AF control and AE control.

4 Claims, 10 Drawing Sheets

U.S. PATENT DOCUMENTS

| | | | |
|---|---|---|---|
| 2008/0037841 A1* | 2/2008 | Ogawa | 382/118 |
| 2008/0211928 A1* | 9/2008 | Isomura et al. | 348/231.99 |
| 2009/0059061 A1* | 3/2009 | Yu et al. | 348/347 |
| 2009/0141141 A1* | 6/2009 | Onozawa | 348/222.1 |
| 2009/0180696 A1* | 7/2009 | Minato et al. | 382/195 |
| 2009/0290756 A1* | 11/2009 | Ramaswamy et al. | 382/103 |

* cited by examiner

SET NUMBER OF PEOPLE TO BE TAKEN 1 2 3 4 5
6 7 8 9 0

SETTING OK        0 0

FIG.2B

SET NUMBER OF PEOPLE TO BE TAKEN 1 2 3 4 5
6 7 8 9 0

SETTING OK        0 1

FIG.2C

SET NUMBER OF PEOPLE TO BE TAKEN 1 2 3 4 5
6 7 8 9 0

SETTING OK        1 2

IMAGE TAKING APPARATUS AND IMAGE TAKING METHOD

FIELD OF THE INVENTION

The present invention relates to an apparatus and a method for taking images automatically after counting the number of subjects, for example, the number of people.

BACKGROUND OF THE INVENTION

Image taking apparatuses which take images by an image sensor such as a CCD and store the images as image data, for example digital cameras, are widely used. Various techniques are devised to take images of the subjects under optimum conditions while taking advantage of features of images, derived from converting the taken images into electrical signals.

For example, Japanese Patent Laid-Open Publication No. 2003-092701 suggests an image taking apparatus which automatically presses a release button and takes an image when a face image is recognized and each part of the face is identified.

U.S. Patent Publication No. 2006/0197845 (corresponding to Japanese Patent Laid-Open Publication No. 2006-237961) suggests an image taking apparatus provided with a motion area detecting section, a face detecting section and a control section, and an automatic image taking method using this image taking apparatus. Based on the image data, the motion area detecting section detects a block in which motion is detected as a motion area among blocks formed by dividing an image frame. The face detecting section detects a human face based on the image data. The control section takes an image when the motion in the motion area containing a human face is stopped.

In addition, Japanese Patent Laid-Open Publication No. 2006-005662 suggests an electronic camera and an electronic camera system for taking an image after detecting a position of a face region of a person (subject) and when a motion amount of the position of the face region is within a predetermined range for a predetermined time.

In a so-called self-timer shooting in which a photographer is also a subject, the photographer enters into a shooting range after a predetermined operation of the digital camera. The above-described Japanese Patent Laid-Open Publication No. 2003-092701 has a problem that an image is taken immediately after the face image is recognized and each part of the face is identified even before the photographer enters into the shooting range. In this case, the photographer is not included in the taken image.

Also in the self-timer shooting of the U.S. Patent Publication No. 2006/0197845, the image is taken when motion in the motion area containing faces is stopped even before the photographer enters into the shooting range.

The electronic camera disclosed in the Japanese Patent Laid-Open Publication No. 2006-005662 has a predetermined standby time after the release button is fully pressed. However, if the photographer fails to enter into the shooting range within the predetermined standby time, the photographer is not included in the taken image. When the standby time is extended to ensure the photographer to enter into the shooting range, the standby time may become too long for the subjects (people) other than the photographer. The subjects (people), especially children, cannot wait until the image is taken and make motion, which result in blurs in the taken image.

SUMMARY OF THE INVENTION

In view of the foregoing, an object of the present invention is to provide an image taking apparatus and an image taking method for reliable automatic shooting such as a self-timer shooting.

In order to achieve the above and other objects, an image taking apparatus of the present invention includes a number setting section, an object detecting section, a number matching section, and a control section. The number setting section sets the number of specific objects to be contained in a subject image. The object detecting section detects one or more specific objects contained in the subject image based on the image data, and counts the number of the detected specific objects. The number matching section judges whether the number of the specific objects set by the number setting section and the number of the specific objects detected by the object detecting section match each other. The control section outputs the image-taking start signal when the number matching section judges that the numbers match each other.

It is preferable that the specific objects are human faces. Other than the human faces, the specific objects may be faces of animals such as dogs and cats.

It is preferable that the control section outputs the image-taking start signal when a predetermined time lapses after the number matching section judges that the numbers match.

It is preferable that the control section outputs the image-taking start signal after at least one of focus adjustment and exposure adjustment is performed after the number matching section judges that the numbers match.

The image taking apparatus further includes a motion judging section for judging whether the specific object is in motion. It is preferable that the control section outputs the image-taking start signal after the number matching section judges that the numbers match each other and after the motion judging section judges that the specific object is motionless.

In a preferred embodiment of the present invention, the image taking apparatus includes an object detecting section, an increment or decrement setting section, an increment or decrement matching section, a motion judging section, and a control section. The object detecting section detects the number of specific objects contained in the subject image based on the image data. The increment or decrement setting section sets an increment or decrement of the detected number. The increment or decrement matching section judges whether an equation $Q3=Q1+Q2$ is satisfied, when $Q1$ is the increment or decrement set in the increment or decrement setting section, and $Q2$ is the detected number of the specific objects in the image data of the time when the $Q1$ is set, and $Q3$ is the detected number of the specific objects in the latest image data. The motion judging section judges whether the specific object is in motion. The control section outputs the image-taking start signal after the increment and the decrement judging section judges that $Q3=Q1+Q2$ is satisfied, and after the motion judging section judges that the specific object is motionless.

An image taking method of the present invention includes the following steps: setting the number of specific objects to be contained in the subject image; detecting and counting the specific objects contained in the subject image based on the image data; judging whether the number of the specific objects set in the number setting step and the number of the specific objects detected in the number detecting step match each other; and outputting the image-taking start signal when the numbers are judged to match in the number matching step.

A preferred embodiment of the present invention includes the following steps: detecting the number of the specific objects contained in the subject image based on the image data; setting an increment or decrement of the detected number; judging whether an equation Q3=Q1+Q2 is satisfied, when Q1 is the increment or decrement set in the increment or decrement setting step, Q2 is the detected number of the specific objects in the image data of the time when the Q1 is set, and Q3 is the detected number of the specific objects contained in the latest image data; judging whether the specific object is in motion; and outputting the image-taking start signal when it is judged that Q3=Q1+Q2 is satisfied in the increment or decrement judging step, and the specific object is judged motionless in the motion judging step.

According to the image taking apparatus of the present invention, the number of the specific objects is set, and the image-taking start signal for storing the image data on the recording medium is output when the number of the specific objects and the detected number of the specific objects match. By properly setting the number of the specific objects, the image-taking is delayed until the photographer is detected even when the photographer enters into the shooting range late, and the image is taken only after the photographer is detected. Thereby, problems, such as an image is taken before the photographer enters into the shooting range in the self-timer shooting, are solved.

The image-taking start signal is output after a predetermined time after the matching of the set number of the specific objects and the detected number of the specific objects. Therefore, the photographer has a time to stand still after entering into the shooting range even when the photographer enters into the shooting range late. As a result, a failure caused by taking the photographer before standing still, such as a blurred face, is prevented.

According to the image taking apparatus of the present invention, the increment or decrement Q1 of the specific objects is set, and the image-taking start signal is for storing the image data on the recording medium is output when the detected number Q3 of the specific objects in the latest image data equals the sum of the increment or decrement Q1 and the detected number Q2 of the specific objects in the image data of the time the increment or decrement Q1 is set. Accordingly, by properly setting the increment or decrement Q1, the image-taking is delayed until the photographer is detected, and taken only after the photographer is detected, even when there are a large number of people to be taken and it is difficult to ascertain the exact number.

BRIEF DESCRIPTION OF THE DRAWINGS

The above objects and advantages of the present invention will become more apparent from the following detailed description when read in connection with the accompanying drawings, in which.

DESCRIPTION OF THE PREFERRED EMBODIMENTS

Figure 1:
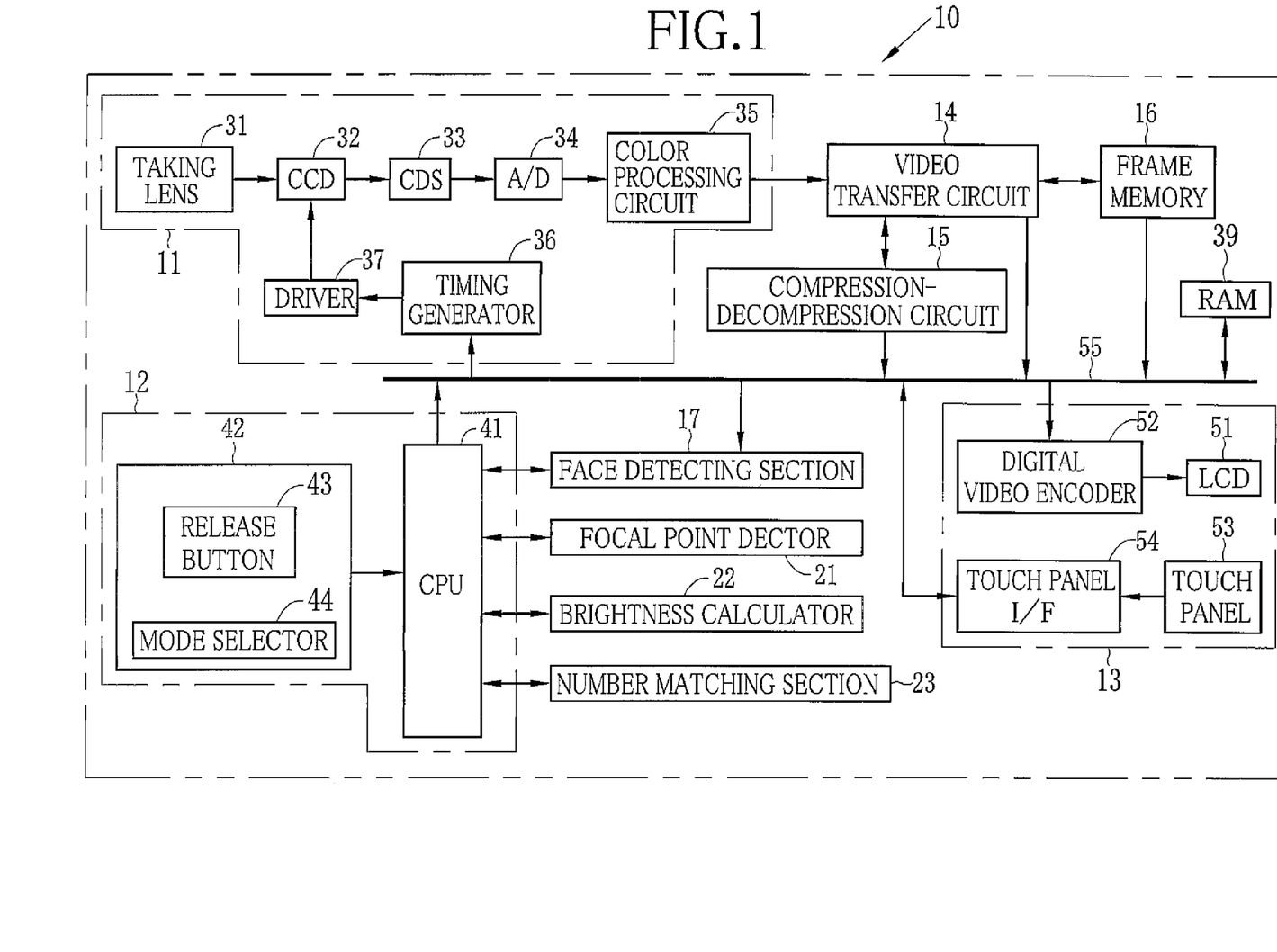
FIG. 1 is a block diagram of an electrical configuration of a digital camera of the present invention.

As shown in FIG. 1, a digital camera 10 is provided with an image producing system 11, a control system 12, an image display system 13, a video transfer circuit 14, a compression/decompression circuit 15, a frame memory 16, and a face detecting section (object detecting section) 17. Additionally, the digital camera 10 is provided with a focal point detector 21, a brightness calculator 22, a number matching section 23.

The image producing system 11 has a taking lens 31, a CCD (an imaging device) 32, a correlated double sampling circuit (CDS) 33, an A/D converter 34, a color processing circuit 35, a TG (timing generator) 36, and a driver 37. Subject light enters into the CCD 32 through the taking lens 31. The CCD 32 photoelectrically converts the subject image and generates RGB signals in time series, and sends the RGB signals to the CDS 33. A timing signal (clock signal) is input to the driver 37 from the TG 36 controlled by the CPU 41. The CCD 32 is driven by the driver 37.

The RGB signals output from the CCD 32 are sent to the CDS 33. In the CDS 33, noise is removed from the RGB signals such that each signal accurately corresponds to an amount of accumulated charge of a corresponding cell in the CCD 32. The RGB signals output from the CDS 33 is amplified by an amplifier (not shown) in accordance with ISO sensitivity, and converted into an image data in the A/D converter 34.

The color processing circuit 35 performs image processing to the image data output from the A/D converter 34, for example, offset correction, white balance processing, color matrix processing, gradation conversion, demosaicing, and edge enhancement. Thereafter, the image data is output from the color processing circuit 35 to the video transfer circuit 14.

The video transfer circuit 14 is connected to the compression/decompression circuit 15 and the frame memory 16. The compression/decompression circuit 15 performs compression and decompression on the image data.

Image data of a through image (a simplified image) is temporarily stored in the frame memory 16 when an LCD 51 is used as a viewfinder, namely, when the through image is taken or preparatory imaging is performed. The through image is a frame image with low resolution. The through image is displayed on the LCD 51. The digital camera 10 has a RAM (recording medium) 39 for storing high-resolution image data when an image to be stored is taken.

The control system 12 is composed of a CPU (control section) 41 and an operating section 42. The operating section 42 has a release button 43 and a mode selector 44. The release button 43 has a switch S1 (not shown) and a switch S2 (not shown). The switch S1 is turned on when the release button 43 is half-pressed. The Switch S2 is turned on when the release button 43 is fully pressed. Upon receiving an ON signal from the switch S1, the CPU 41 performs preparatory processing such as AF (autofocus) control and AE (auto exposure) control. Upon receiving an ON signal from the switch S2, the CPU 41 controls each section of the digital camera 10 to take an image that is to be stored. The operating section 42 includes, in addition to the release button 43 and the mode selector 44, a zoom up button (not shown) and a zoom down button (not shown) for optically or electronically enlarging or reducing the taken image, a playback button (not shown) for reproducing the data stored in a RAM 39, a display changeover button (not shown) for changing the image displayed on the LCD 51, and a menu key (not shown) for various settings. In addition to the AF control and the AE control, automatic white-balance control (hereinafter referred to as AWB) can be performed in the preparatory processing.

The digital camera 10 is provided with a normal shooting mode, an automatic shooting mode, and a playback mode. In the normal shooting mode, the release button 43 is operated to take an image. In the automatic shooting mode, the image-taking is started without operating the release button 43. In the playback mode, the stored image is reproduced and displayed on the LCD 51. To select the mode, the mode selector 44 is operated. The automatic shooting mode is selected to take a self-portrait. In this case, the digital camera 10 is fixed to a tripod or the like.

To take an image (namely, when the release button 43 is fully pressed in the normal shooting mode, or the preparatory processing is completed in the automatic shooting mode), the CPU 41 outputs an image-taking start signal to the image producing system 11, the video transfer circuit 14 and the compression/decompression circuit 15. When the image-taking start signal is input, the image producing system 11 outputs high-resolution image data to the video transfer circuit 14. The video transfer circuit 14 outputs the high-resolution image data to the compression/decompression circuit 15. The compression/decompression circuit 15 compresses the high-resolution image data. The compressed high-resolution image data is stored in the RAM (recording medium) 39 by a data reader (not shown) driven and controlled by a memory controller (not shown). Instead of using the RAM 39, the image data can be stored on a recording medium detachably connected such as a memory card. In addition, the image data can be stored in both the RAM 39 and the memory card.

The image display system 13 is composed of the LCD 51, a digital video encoder 52, a touch panel 53, and a touch panel I/F 54. When the LCD 51 is used as a viewfinder, namely when the thorough image is taken, image data of the through image (through image data) stored in the frame memory 16 is sent to the LCD 51 through a data bus 55 and the digital video encoder 52.

Figure 2A:
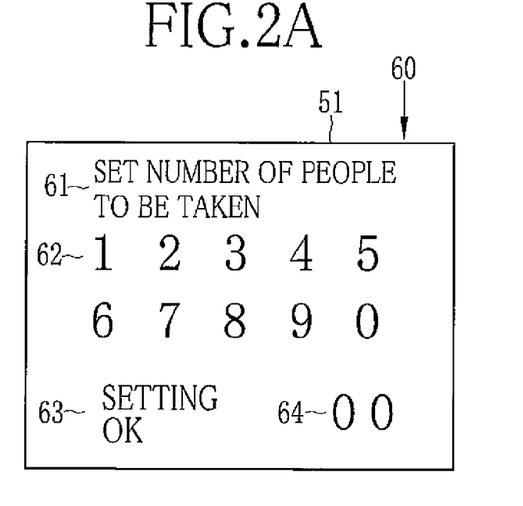
FIG. 2A to FIG. 2C are explanatory views of a number setting display for setting the number of people to be taken.

The touch panel 53 is provided on the back side of the LCD 51. The touch panel 53 is connected to the CPU 41 through the touch panel I/F 54 and the data bus 55. When the digital camera 10 is switched to the automatic shooting mode, as shown in FIG. 2A, the CPU 41 displays on the LCD 51 a number setting display 60 for setting the number of people (the number of specific objects) to be taken and enables the touch panel I/F 54. On the number setting display 60, a message 61 "set the number of people to be taken" is displayed. Below the message 61, a number button 62, with numerals of zero to nine, for setting the number of people to be taken, a setting OK button 63, and a set number display area 64 are displayed. The number of people to be taken is set by touching any numeral of the number button 62 with a finger (hereinafter simply referred to as touching), and confirmed when the setting OK button 63 is touched. Before touching the number button 62, "00" is displayed in the set number display area 64.

Figure 2B:
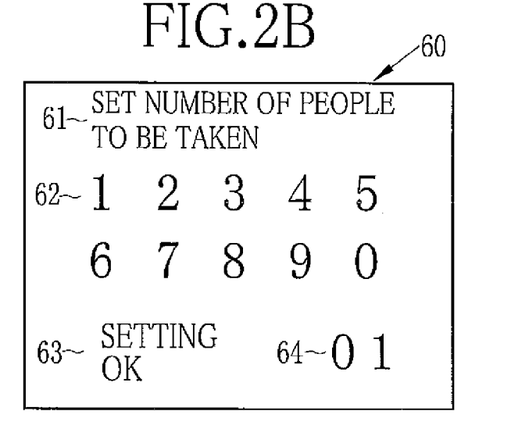
Figure 2C:
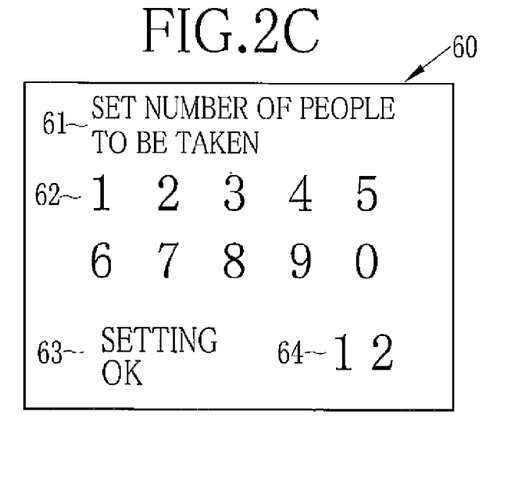

When a photographer touches the number button 62 displayed on the LCD 51, the touch panel I/F 54 outputs a touch signal to the CPU 41. For example, to set "12" as the number of people to be taken, the photographer touches "1" of the number button 62 first. When the photographer touches "1" of the number button 62, as shown in FIG. 2B, the touch panel I/F 54 outputs the touch signal corresponding to "1" to the CPU 41. The CPU 41 displays "01" in the set number display area 64. Next, the photographer touches "2" of the number button 62. When "2" is touched, as shown in FIG. 2C, the touch panel I/F 54 outputs the touch signal corresponding to "2" to the CPU 41. The CPU 41 displays "12" in the set number display area 64. The photographer is able to set the number of people to be taken while checking the number displayed in the set number display area 64.

When the photographer touches the setting OK button 63, the touch panel I/F 54 outputs a touch signal to the CPU 41. The CPU 41 stores the number "12" in the frame memory 16 as the number of people to be taken, and closes the number setting display 60, and displays the through image being taken on the LCD 51. The number matching section 23 judges whether the set number stored in the frame memory 16 and the number of the faces detected by the face detecting section 17 match each other. In this embodiment, a number setting section for setting the number of faces to be taken is composed of the CPU 41, the LCD 51, the touch panel 53, and the touch panel I/F 54.

As shown in FIG. 1, the face detecting section 17 detects the faces as the specific objects in the image data when the release button 43 is half-pressed in the normal shooting mode or automatically does the same thing in the automatic shooting mode. The through image data stored in the frame memory 16 is input to the face detecting section 17. The face detecting section 17 detects the face by pattern recognition of features such as eyes, a nose and a mouth based on the through image data. Known face detecting methods, such as feature vector approximation method, a face detecting method by edge detection or shape pattern detection, a face region detecting method by hue detection or skin color detection (see, for example, Japanese Patent Laid Open Publication No. 2005-286940) can be used. In the feature vector approximation method, each of the above described features is vectorized, and the face is detected by approximate detection of the feature vector. In this embodiment, the face detecting section 17 is able to detect up to 20 faces. The number of faces to be detected can be changed as necessary.

The result of the face detection by the face detecting section 17 is used in the AF control, the AE control, the AWB control and the like. The result of the face detection can also be used for correction in the AF control, the AE control, the AWB control and the like.

The face detecting section 17 detects faces in the image data and, in the automatic shooting mode, counts the number of detected faces and outputs the number of detected faces as the number of detected people to the number matching section 23.

The number matching section 23 judges whether the set number stored in the frame memory 16 and the number of detected people input from the face detecting section 17 match each other. When it is judged that the set number and the detected number match, the number matching section 23 outputs a match signal to the CPU 41. Upon receiving the match signal, the CPU 41 starts the preparatory processing (the AF control and the AE control). Upon completion of the preparatory processing, the CPU 41 outputs the image-taking start signal to the image producing system 11, the video transfer circuit 14 and the compression/decompression circuit 15.

The face detecting section 17 may output information indicating a face region (for example, a frame around the face) to the CPU 41. In this case, such information is used for storing and displaying the image. For example, when the through image is displayed on the LCD 51 as the viewfinder, the photographer recognizes that the face of the subject is detected when the frame is displayed around the face of the subject.

The focal point detector 21 detects focal condition based on the contrast of the through image stored in the frame memory 16 when the release button 43 is half-pressed or when the number matching section 23 judges the matching of the set number and the detected number in the automatic shooting mode.

The brightness calculator 22 calculates the brightness of the face of the subject using a known calculating method based on the through image data stored in the frame memory 16 when the release button 43 is half-pressed or when the number matching section 23 judges the matching in the automatic shooting mode.

When the photographer fully presses the release button 43 in the normal shooting mode, image-taking processing for storing the taken image is performed. The CPU 41 controls each part of the digital camera 10 to take the image to be stored after the AF control and the AE control.

Figure 3A:
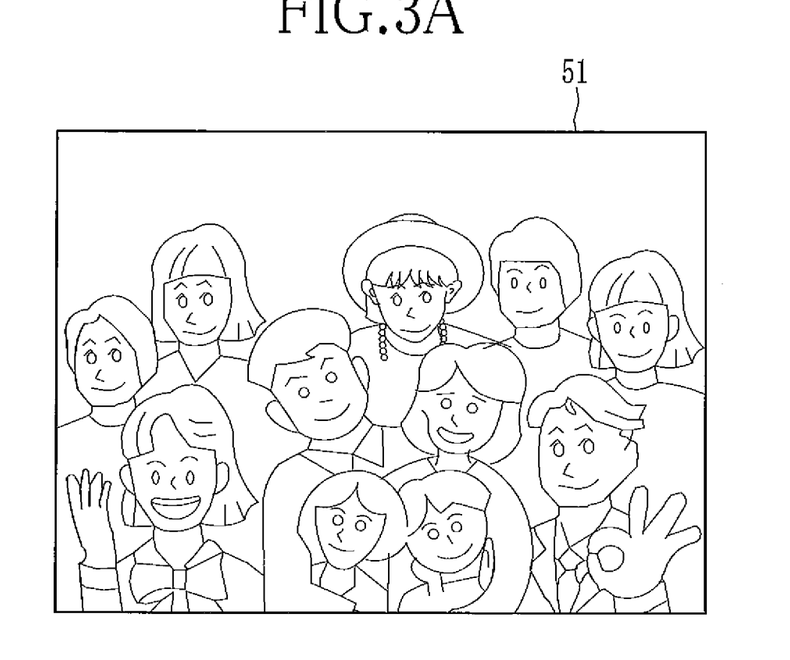
FIG. 3A and FIG. 3B are explanatory views of a through image displayed on the LCD.

As shown in FIG. 3A, when the number of people to be taken is set in the automatic shooting mode, the through image is displayed on the LCD 51. For example, when the photographer sets "12" as the number of people to be taken, the preparatory processing is not performed in a state that the face detecting section 17 detects 11 faces in the through image data.

Figure 3B:
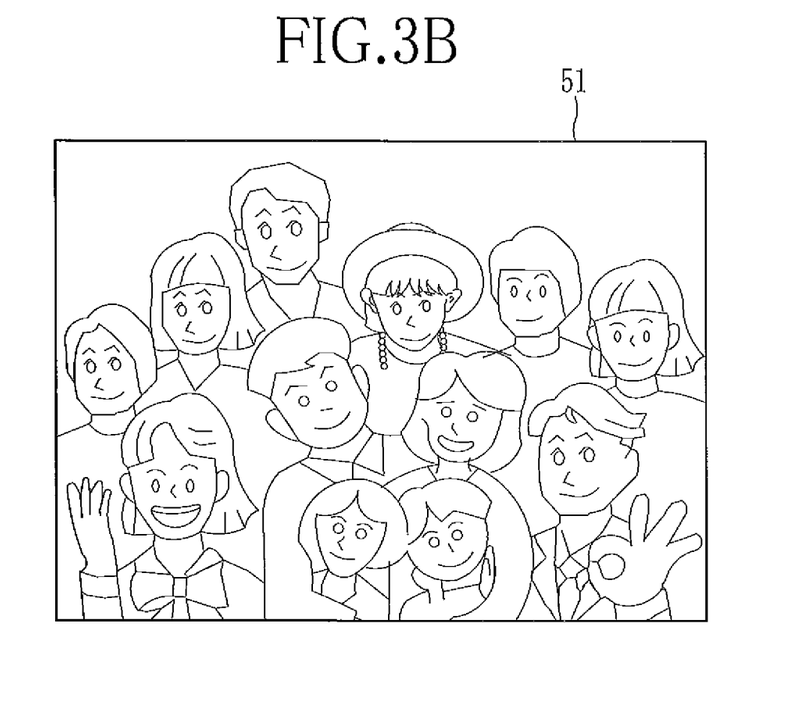

As shown in FIG. 3B, when the photographer enters into the shooting range as a subject, the face detecting section 17 detects 12 faces in the through image data. Thereby, the number matching section 23 judges that the set number ("12") stored in the frame memory 16 and the number ("12") detected by the face detecting section 17 match each other, and outputs the match signal to the CPU 41. In response to this, the CPU 41 performs the preparatory processing. Upon completion of the preparatory processing, the CPU 41 controls to perform the image-taking processing.

Figure 4:
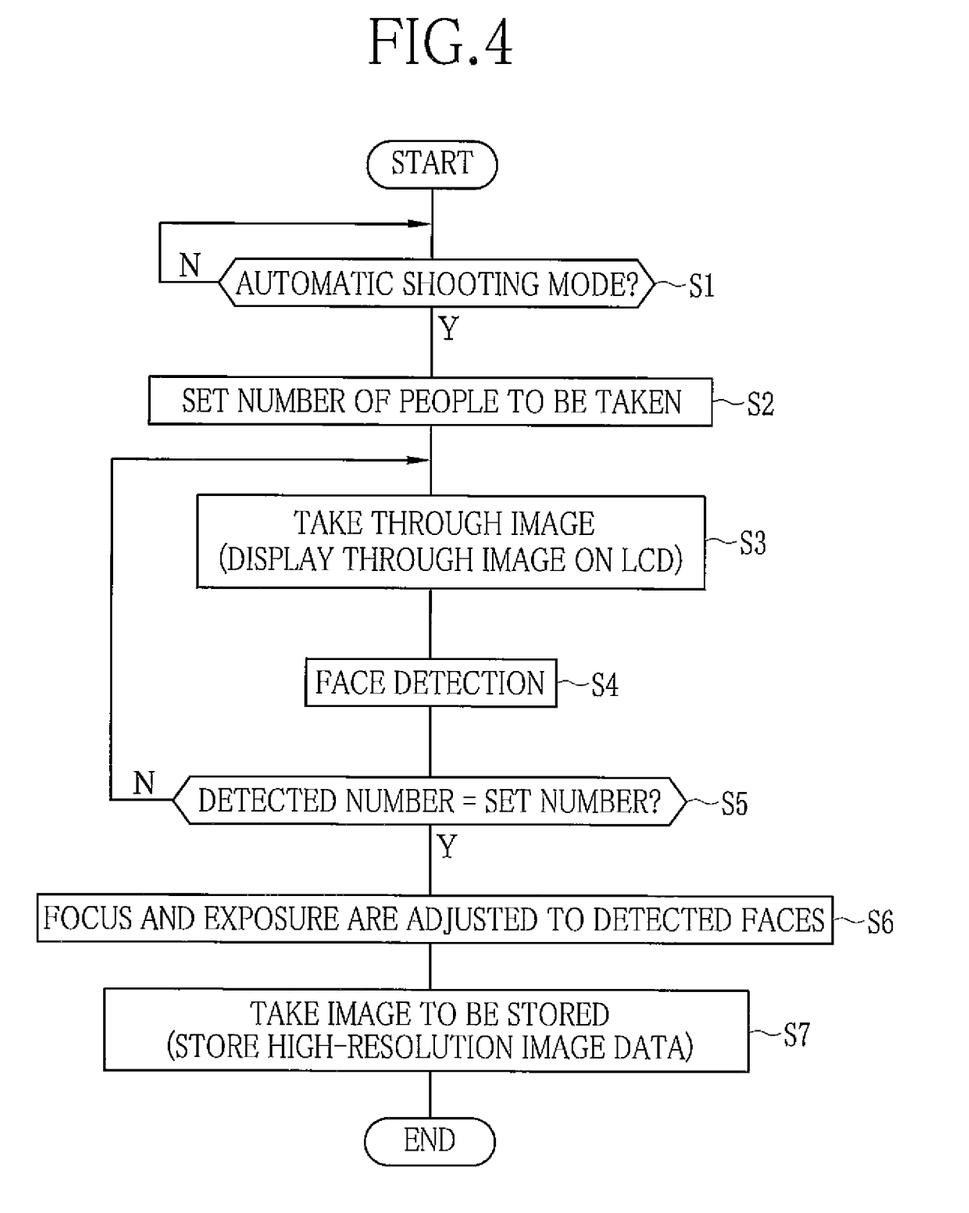
FIG. 4 is a flowchart showing steps for taking an image in an automatic shooting mode.

The operation of the digital camera 10 is described using the flowchart shown in FIG. 4. By operating the mode selector 44, the digital camera 10 is set in the automatic shooting mode (Y in a step 1, hereinafter step is referred to as S) to automatically take an image. In the automatic shooting mode, the CPU 41 displays the number setting display 60 on the LCD 51. The photographer sets the number of people to be taken (S2). The set number is stored in the frame memory 16. Next, the through image is started to be taken, and the obtained through image is stored in the frame memory 16 and also displayed on the LCD 51 (S3). The face detecting section 17 detects and counts faces in the through image, and outputs the number of detected faces as the number of detected people to the number matching section 23 (S4).

The number matching section 23 judges whether the set number stored in the frame memory 16 and the number input from the face detecting section 17 match each other (S5). When the number matching section 23 judges that the set number and the detected number match (Y in S5), the number matching section 23 outputs the match signal to the CPU 41.

In response to this, the CPU 41 performs the AF control and AE control (S6). Thereafter, the image-taking processing is started (S7).

On the other hand, when the number matching section 23 judges that the set number and the detected number do not match (N in S5), the above S3, S4, and S5 are performed again. In other words, the S3 to S5 are repeated until the number matching section 23 judges that the set number and the detected number match (Y in S5).

As described above, in the automatic shooting mode, the image is taken when the number of people set by the photographer and the number of faces detected by the face detecting section 17 match. Since the set number is greater by 1 than the detected number at the time of setting, the image is taken only after the photographer enters into the shooting range. Thus, a failure in the self timer shooting, namely, an image taken before the photographer enters into the shooting range is prevented. The photographer is able to take his/her time to enter into the shooting range without being in a hurry as in the self timer shooting.

When it is judged that the set number and the detected number match each other, the image-taking processing is performed after the preparatory processing (the AE control and the AF control). Therefore, preparatory processing is also performed to the photographer that enters into the shooting range late. The image is taken under an optimum condition compared to the digital camera which performs the image-taking processing immediately after the detection of the photographer.

In the above embodiment, when the number matching section 23 judges that the set number and the detected number match, the image-taking processing is performed after the preparatory processing. Alternatively, it is also possible to perform the image-taking processing without the preparatory processing. In this case, the image-taking processing is not performed until the face of the photographer that entered into the shooting range late is detected. In addition, it is also possible to set that a face in motion is not detected by the face detection. Accordingly, the image-taking processing is not performed when the photographer moves toward a predetermined position until the photographer reaches there and stops. Thus, the failure caused by taking the subject in motion, such as a blurred face, is prevented.

In the above embodiment, the number of people to be taken is set using the touch panel 53 and the touch panel I/F 54. Instead, a menu key or the like provided in the operating section 42 may be used.

Figure 5:
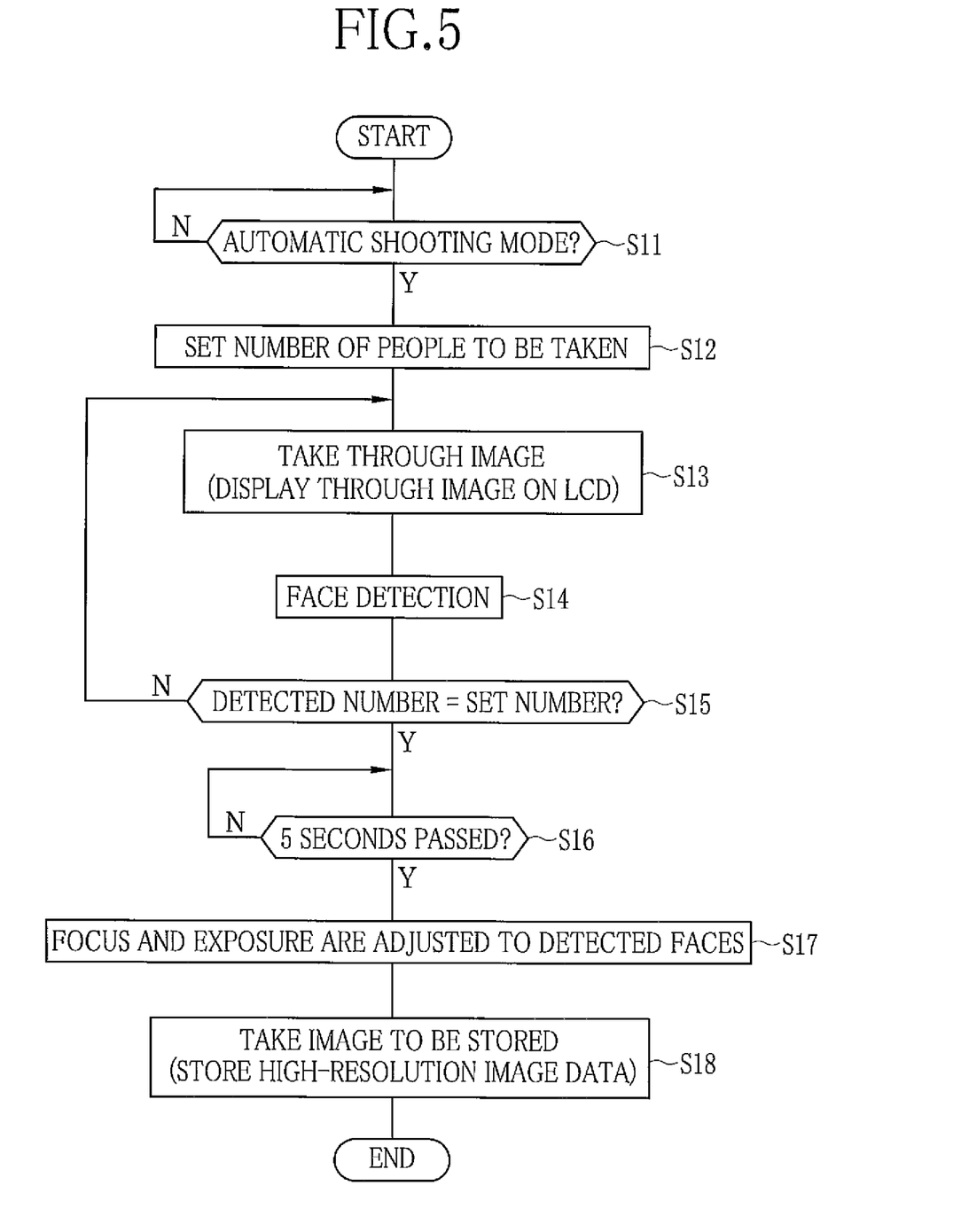
FIG. 5 is a flowchart showing steps of an embodiment in which an image is taken 5 seconds after the set number and the detected number match.

In the above embodiment, when the number matching section 23 judges that the set number stored in the frame memory 16 and the number detected by the face detecting section 17 match, the CPU 41 controls to perform the image-taking processing after the preparatory processing. Alternatively, the CPU 41 may control to perform steps shown in FIG. 5. In this embodiment, S11 to S15 are the same as the steps 1 to 5 shown in FIG. 4. When the number matching section 23 judges that the set number and the detected number match (Y in S15), the CPU 41 judges whether a predetermined time (for example, 5 seconds) has passed (S16). When it is judged that 5 seconds have passed (Y in S6), the CPU 41 controls to perform image-taking processing (S18) after the preparatory processing (S17). Thereby, the photographer has a time to stand still after entering into the shooting range, and failures caused by taking the subject in motion, such as the blurred face, is prevented. The time lapse can be changed as necessary.

Figure 6:
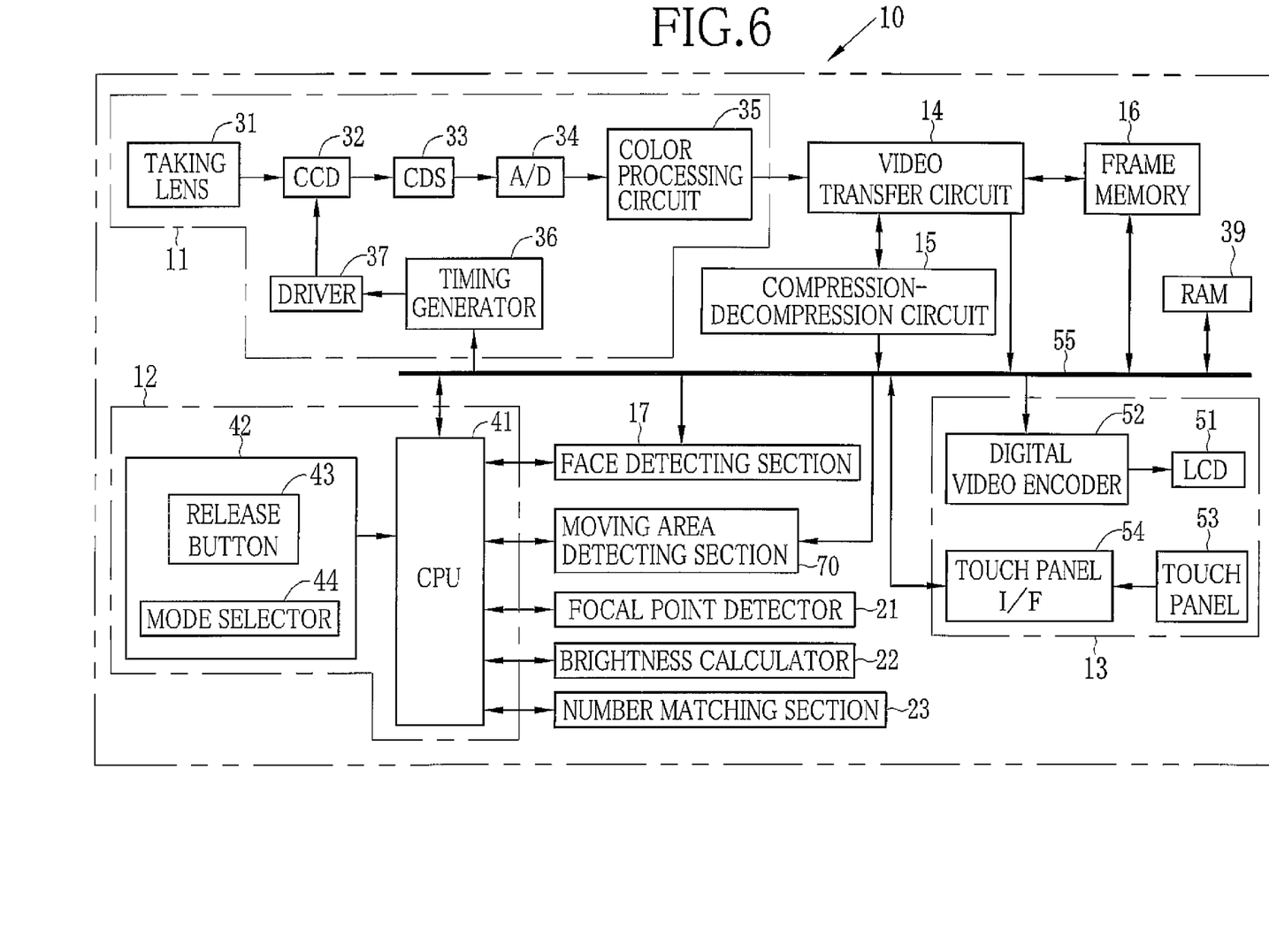
FIG. 6 is a block diagram of an electrical configuration of a digital camera provided with a motion area detecting section.
Figure 7:
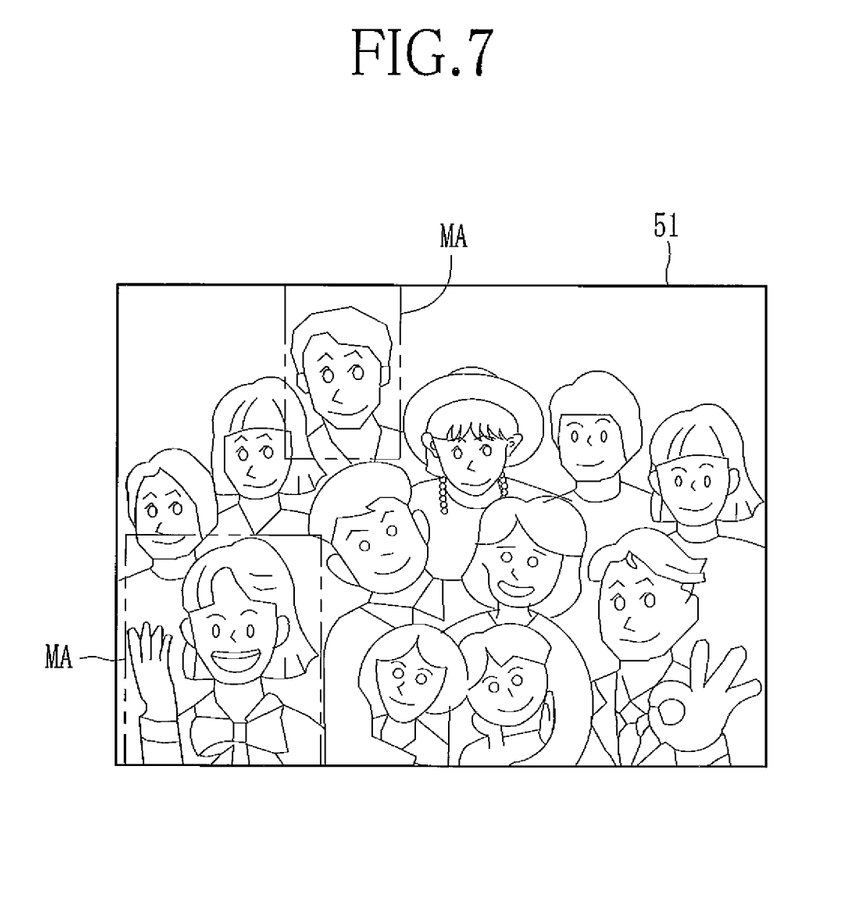
FIG. 7 is an explanatory view of a through image displayed on the LCD of an embodiment shown in FIG. 6.
Figure 8:
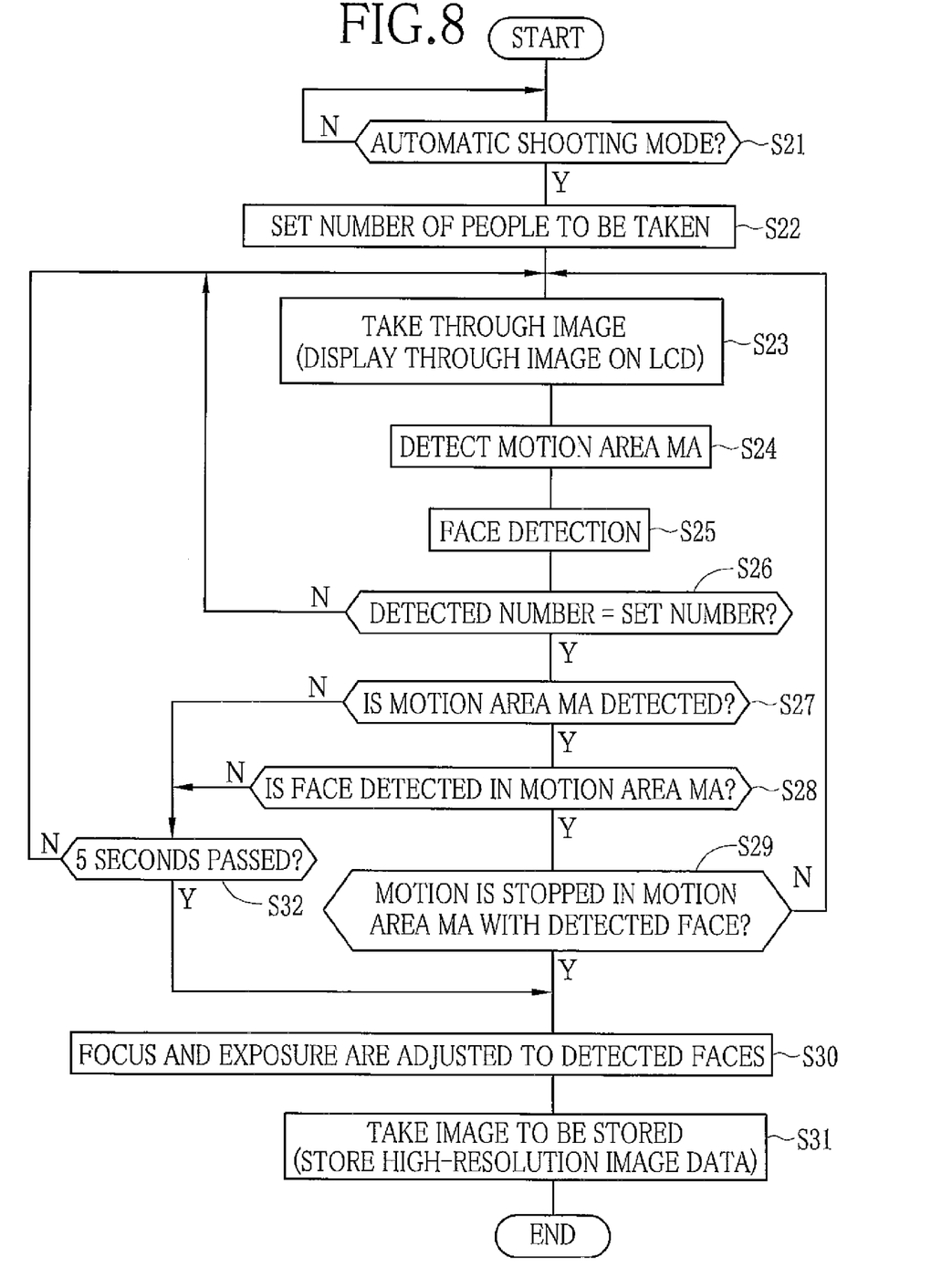
FIG. 8 is a flowchart showing steps of image-taking processing in the embodiment shown in FIG. 6.

Another embodiment of the present invention is shown in FIGS. 6, 7 and 8. In FIG. 6, the same components are designated by the same numerals as the embodiment depicted in FIG. 1, and the detailed explanation thereof is omitted. In this embodiment, the digital camera 10 has a motion area detecting section 70.

The through image stored in the frame memory 16 is input to the motion area detecting section 70 through the data bus 55. As shown in FIG. 7, the motion area detecting section 70 divides the through image displayed on the LCD 51 into blocks, and detects a block as a motion area MA where a moving subject is detected.

The motion area detecting section 70 uses for example, a motion vector detection method in which a motion vector V is detected, a frame difference detection method in which frames are correlated, or a background difference detection method in which an area with motion is identified with respect to a motionless background. For example, in the case the motion vector detection method is used, sequential through images are input to the motion area detecting section 70 from the frame memory 16. The motion area detecting section 70 detects changes in the through images by, for example, changes in their brightness level, and the motion vector V is detected based on the detected results. The motion area detecting section 70 detects a block in which a motion vector V is equal to or above a predetermined value as the motion area MA. The CPU 41 judges whether the motion area MA is detected by the motion area detecting section 70. When the motion area MA is detected, it is judged whether a face is detected in the motion area MA. In this embodiment, a motion judging section for judging whether a face (specific object) is moving is composed of the CPU 41 and the motion area detection section 70.

As shown in FIG. 8, when the digital camera 10 is set in the automatic shooting mode (Y in S21), the number of faces to be taken is set using the number setting display 60 displayed on the LCD 51 (S22). When the number of people to be taken is set, the through image is stored in the frame memory 16 and displayed on the LCD 51 (S23). Next, the motion area detecting section 70 detects the motion area MA (S24). The face detecting section 17 detects and counts the faces in the through image, and outputs the number of detected faces as the number of detected people to the number matching section 23 (S25).

The number matching section 23 judges whether the set number stored in the frame memory 16 and the detected number input from the face detecting section 17 match each other (S26). When the number matching section 23 judges the set number and the detected number match (Y in S26), the CPU 41 judges whether the motion area MA is detected by the motion area detecting section 70 (S27). When the motion area MA is detected (Y in S27), the CPU 41 judges whether a face is detected in the motion area MA (S28).

When the face is detected in the motion area MA (Y in S28), the CPU 41 judges whether motion is stopped in the motion area MA in which the face is detected (S29). When it is judged that the motion is stopped (Y in S29), the CPU 41 performs preparatory processing (S30). After the completion of the preparatory processing, the CPU controls to perform the image-taking processing (S31).

On the other hand, when the motion area MA is not detected (N in S27), and when a face is not detected in the motion area MA (N in S28), the CPU 41 judges whether a predetermined time (for example, 5 seconds) has passed (S32). When it is judged that 5 seconds has passed (Y in S32), the CPU 41 performs the preparatory processing (S30). After the completion of the preparatory processing, the CPU 41 controls to perform the image-taking processing (S31).

As described above, it is judged whether the face as the object is moving, and the image is taken only when the face remains still. As a result, the failure caused by taking the subject in motion, such as the blurred face, is prevented.

When a face is not detected in the motion area MA, the preparatory processing and the subsequent image-taking processing is performed after the 5 seconds lapse. Accordingly, the image is taken without waiting for a stop of motion in the motion area MA in which the face is not detected, for example, a motion area MA in which swaying leaves are detected in outdoor shooting.

Figure 9A:
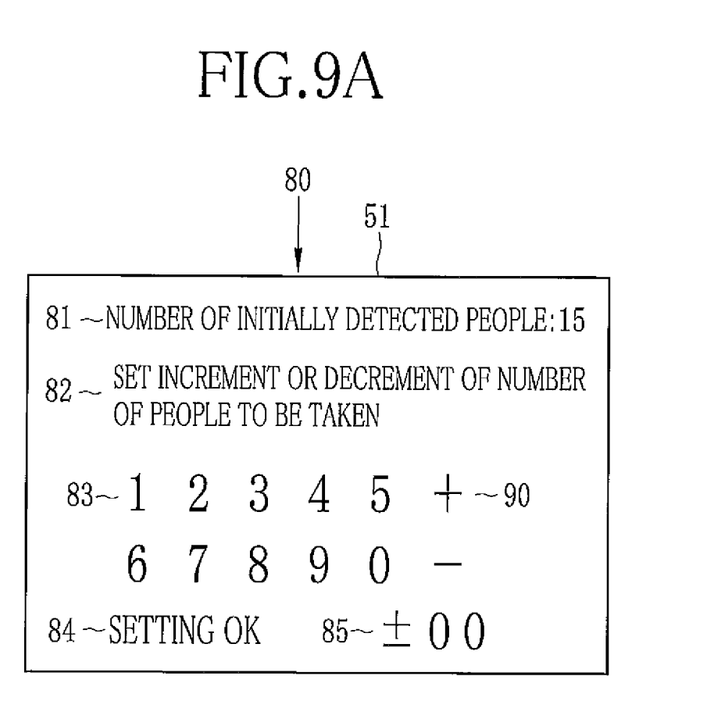
FIG. 9A and FIG. 9B are explanatory views of an increment or decrement setting display displayed on an LCD of an embodiment in which an increment or decrement of the number of initially detected people is set.
Figure 9B:
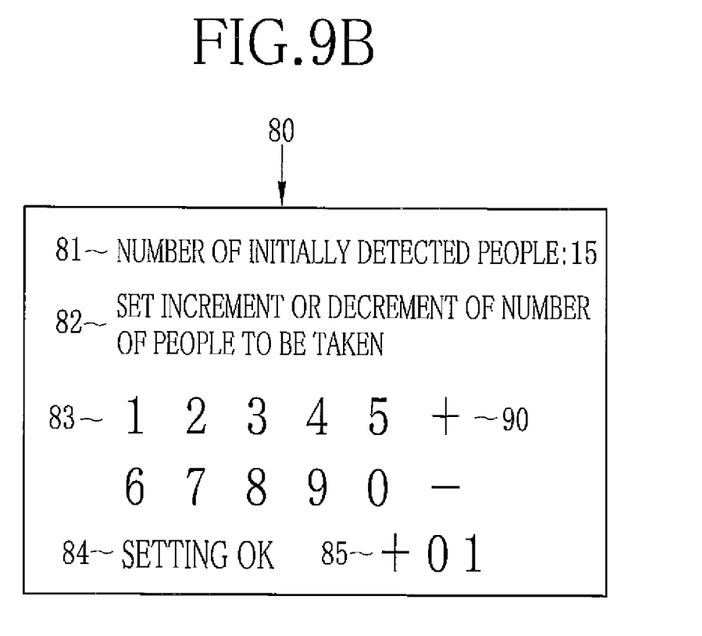
Figure 10:
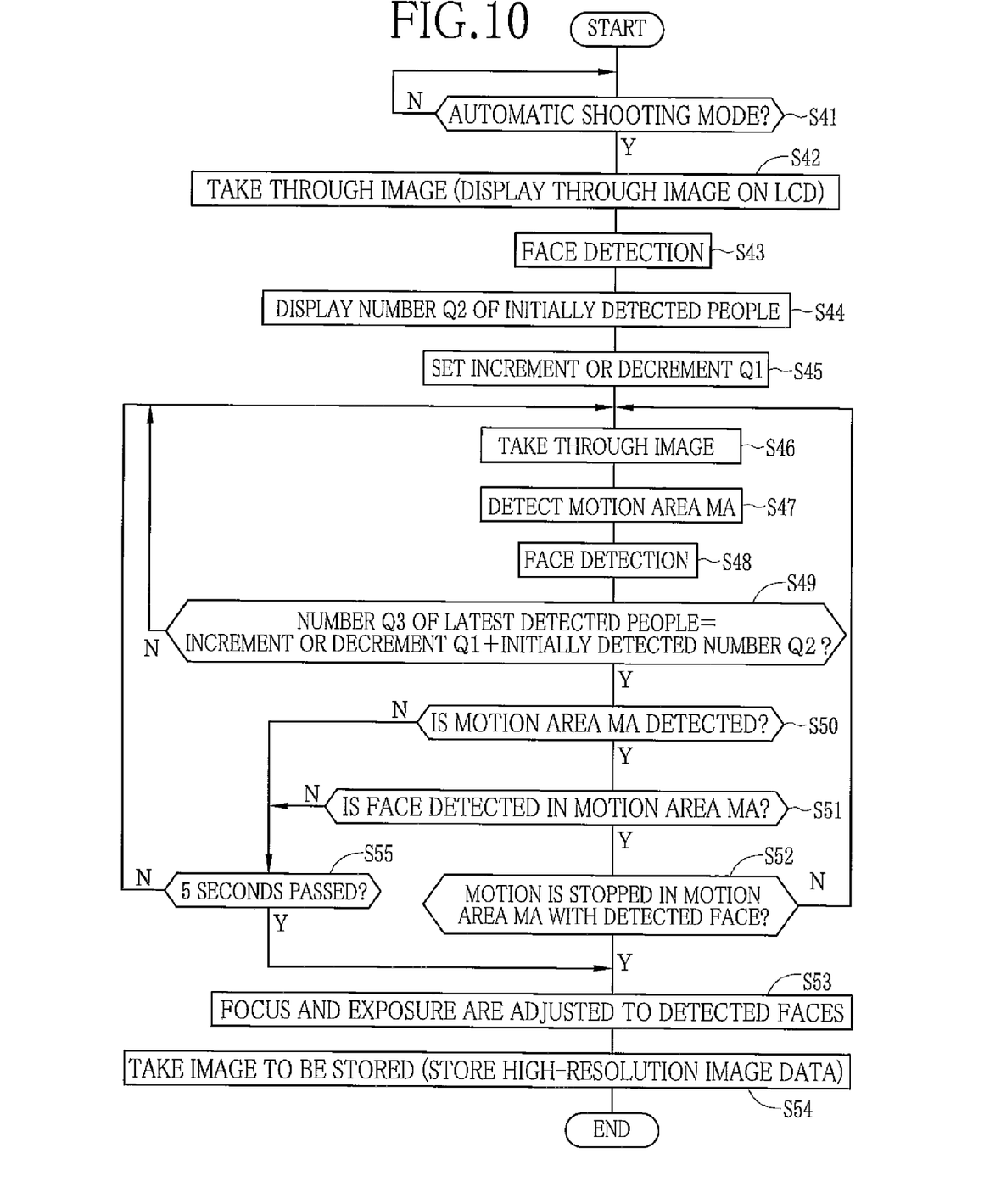
FIG. 10 is a flowchart showing steps of image-taking processing in an embodiment shown in FIG. 9.

A still another embodiment is depicted in FIGS. 9 and 10. In this embodiment, a circuit shown in FIG. 6 is used. When the digital camera 10 is switched to the automatic shooting mode, the face detecting section 17 detects and counts faces in the through image, and stores the number of detected faces as the number of people in the frame memory 16.

As shown in FIG. 9A, the CPU 41 displays on the LCD 51 an increment or decrement setting display 80 for setting an increment or decrement Q1 of the number of people to be taken, and enables the touch panel I/F 54. At the same time, the face detecting section 17 detects the faces in the through image and counts the number of faces as the number of people, and constantly stores the number of the detected people in the frame memory 16. On the increment or decrement setting display 80, an initial number display area 81 for displaying the number Q2 of people initially detected by the face detecting section 17 (for example, "15"), a message 82 indicating "please set the increment or decrement of the number of people to be taken", a number button 83 with numerals of zero to nine, and "+" and "−" sign buttons 90 for setting the increment or decrement Q1, a setting OK button 84 to confirm the increment or decrement Q1 set by touching the number button 83, and a set number display area 85 are displayed. Before touching the number button 83, the set number display area 85 displays "±00". Although the face detecting section 17 constantly updates the number Q2 of initially detected people, the number Q2 of initially detected people is set to be the number of faces detected in the through image of the time the increment or decrement Q1 is set.

When the photographer touches the number button 83 displayed on the LCD 51, the touch panel I/F 54 outputs the touch signal to the CPU 41. For example, to set "+1" as the increment Q1, first, touch the "+" sign button 90, and then the numeral "1" of the number button 83. As shown in FIG. 9B, the CPU 41 displays "+01" in the set number display area 85. The photographer is able to set the increment or decrement Q1 while checking the number displayed on the set number display area 85.

When the photographer touches the setting OK button 84, the CPU 41 stores "+1" as the increment Q1 in the frame memory 16 and closes the increment or decrement setting display 80, and displays the through image on the LCD 51. The face detecting section 17 again detects and counts the number of faces in the latest through image, and outputs the number of detected faces as the number Q3 of latest detected people to the number matching section 23. The number matching section 23 judges whether the number Q3 of the latest detected people equals to the sum of the increment or decrement Q1 and the number Q2 of the initially detected people. In this embodiment, the number matching section 23 functions as an increment or decrement matching section which judges whether the number Q3 of the latest detected people equals to the sum of the increment or decrement Q1 and the number Q2 of the initially detected people.

As shown in FIG. 10, in the automatic shooting mode (Y in S41), the through image is stored in the frame memory 16 and displayed on the LCD 51 (S42). The face detecting section 17 detects the faces in the through image (S43). The CPU 41 displays the increment or decrement setting display 80 and displays the number Q2 of initially detected people (for example, 15) (S44).

After the increment or decrement Q1 of the number of people to be taken is confirmed (S45), the through image is taken again and stored in the frame memory 16 and displayed on the LCD 51 (S46). Next, the motion area detecting section 70 detects the motion area MA (S47). The face detecting section 17 detects and counts the faces in the through image, and outputs the number of faces as the number Q3 of the latest detected people to the number matching section 23 (S48).

The number matching section 23 judges whether the number Q3 of the latest detected people equals to the sum of the increment or decrement Q1 and the number Q2 of the initially detected people (S49). When it is judged that the number Q3 of the latest detected people equals to the sum of the increment or decrement Q1 and the number Q2 of the initially detected people (Y in S49), the CPU 41 judges whether the motion area MA is detected in the motion area detecting section 70 (S50). In the case the motion area MA is detected (Y in S50), it is judged whether a face is detected in the motion area MA (S51).

When a face is detected in the motion area MA (Y in S51), the CPU 41 judges whether motion stops or not in the motion area MA containing a face (S52). When it is judged that the motion is stopped in the motion area MA containing the face (Y in S52), the CPU 41 performs preparatory processing (S53). After the completion of the preparatory processing, the CPU 41 controls to perform the image-taking processing (S54).

On the other hand, when the motion area MA is not detected (N in S50), or a face is not detected in the motion area MA (N in S51), the CPU 41 judges whether a predetermined time (for example, 5 seconds) has passed (S55). When it is judged that 5 seconds have passed (Y in S55), the CPU 41 performs the preparatory processing (S53). After the completion of the preparatory processing, the CPU 41 controls to perform the image-taking processing (S54).

In this embodiment, the increment or decrement Q1 is set in the automatic shooting mode, and the image is taken only when the number Q3 of the latest detected people equals to the sum of the increment or decrement Q1 and the number Q2 of the initially detected people in the image data of the time when the increment or the decrement Q1 is set. Therefore, by properly setting the increment or decrement Q1, the image-taking is delayed until the photographer that enters into the shooting range late is detected, even when there are a large number of people to be taken and it is difficult to ascertain the exact number.

It is also possible to start taking the image without setting the increment or decrement Q1. In this case, the image may be taken when the detected number is increased from the number Q2 of the initially detected people and motion is stopped in the motion area MA in which the face is detected.

In the above embodiments, human faces are detected as the specific objects. The specific objects are not limited to the human faces and can be changed as necessary. It is also possible to detect, for example, faces of animals such as dogs and cats.

In the above embodiments, the image data is stored in the RAM 39. It is also possible to store the image data in a photographic film.

In the above embodiments, the digital camera 10 is provided with the normal shooting mode, an automatic shooting mode, and the playback mode. The present invention is applicable to digital cameras provided at least with the automatic shooting mode.

Various changes and modifications are possible in the present invention and may be understood to be within the present invention.

What is claimed is:

1. An image taking apparatus having an imaging section for sequentially obtaining image data by photoelectrically converting a subject image, said image taking apparatus storing on a recording medium said image data obtained when an image-taking start signal being input, said image taking apparatus comprising:
   a number setting section for setting the number of specific objects to be contained in said subject image;
   an object detecting section for detecting one or more said specific objects contained in said subject image based on said image data, and counting the number of said detected specific objects;
   a number matching section for judging whether said number of said specific objects set by said number setting section and said number of said specific objects detected by said object detecting section match each other;
   a motion area detecting section for detecting one or more motion areas within said imaging section by dividing said imaging section into a plurality of blocks and judging whether each of said blocks has motion components;
   an object judging section for judging whether one or more said specific objects are being detected in each of said motion areas;
   a motion judging section for judging whether said specific objects being detected in each of said motion areas are motionless;
   a preparatory processing section for performing a preparatory process which includes at least one of focus adjustment and exposure adjustment; and
   a control section for outputting said image-taking start signal;
   wherein if said motion areas are not detected or said specific objects are not detected in said motion areas, said control section outputs said image-taking start signal after a predetermined time lapses from when both of said numbers match each other and said preparatory process is performed, and
   wherein if both of said numbers match each other and one or more said specific objects are detected in said motion areas, said control section outputs said image-taking start signal after said specific objects being detected in each of said motion areas are judged being motionless and said preparatory process is performed.

2. The image taking apparatus of claim 1, wherein said specific object is a human face.

3. An image taking method in which image data is sequentially obtained by photoelectrically converting a subject image, and said image data obtained when an image-taking start signal is input being stored on a recording medium, said image taking method comprising the steps of:
   (a) setting the number of specific objects to be contained in said subject image;
   (b) detecting and counting said specific objects contained in said subject image based on said image data;
   (c) judging whether the number of said specific objects set in said step (a) and said number of said specific objects detected in said step (b) match each other;

(d) detecting one or more motion areas within said imaging section by dividing said imaging section into a plurality of blocks and judging whether each of said blocks has motion components;
(e) judging whether one or more said specific objects are being detected in each of said motion areas;
(f) judging whether said specific objects being detected in each of said motion areas are motionless;
(g) performing a preparatory process which includes at least one of focus adjustment and exposure adjustment; and
(h) outputting said image-taking start signal;
wherein if said motion areas are not detected in said step (d) or said specific objects are judged not being detected in said motion areas in said step (e), said image-taking start signal is output after a predetermined time lapses from when both of said numbers match each other in said step (c) and said preparatory process is performed in said step (g), and
wherein if both of said numbers match each other in said step (c) and one or more said specific objects are judged being detected in said motion areas in said step (e), said image-taking start signal is output after said specific objects being detected in each of said motion areas are judged being motionless in said step (f) and said preparatory process is performed in said step (g).

4. The image taking method of claim 3, wherein said specific object is a human face.

* * * * *